United States Patent
Ohara (10) Patent No.: US 9,944,071 B2
(45) Date of Patent: Apr. 17, 2018

(54) PRINTING APPARATUS AND PRINTING METHOD

(71) Applicant: MIMAKI ENGINEERING CO., LTD., Nagano (JP)

(72) Inventor: Eiichi Ohara, Nagano (JP)

(73) Assignee: MIMAKI ENGINEERING CO., LTD., Nagano (JP)

(*) Notice: Subject to any disclaimer, the term of this patent is extended or adjusted under 35 U.S.C. 154(b) by 0 days.

(21) Appl. No.: 15/124,032

(22) PCT Filed: Mar. 6, 2015

(86) PCT No.: PCT/JP2015/056610
§ 371 (c)(1),
(2) Date: Sep. 7, 2016

(87) PCT Pub. No.: WO2015/133597
PCT Pub. Date: Sep. 11, 2015

(65) Prior Publication Data
US 2017/0015097 A1    Jan. 19, 2017

(30) Foreign Application Priority Data

Mar. 7, 2014  (JP) .................. 2014-045620
Feb. 9, 2015  (JP) .................. 2015-022839

(51) Int. Cl.
*B41J 2/045*  (2006.01)
*B41J 2/21*   (2006.01)
*G06K 15/10*  (2006.01)

(52) U.S. Cl.
CPC ....... *B41J 2/04536* (2013.01); *B41J 2/04586* (2013.01); *B41J 2/21* (2013.01);
(Continued)

(58) Field of Classification Search
CPC . B41J 2/145; B41J 2/15; B41J 11/002; G06K 15/107
See application file for complete search history.

(56) References Cited

U.S. PATENT DOCUMENTS

| 6,254,217 B1 * | 7/2001 | Askeland | B41J 2/2132 345/15 |
| 6,601,939 B2 * | 8/2003 | Fujita | G06K 15/107 347/15 |

(Continued)

FOREIGN PATENT DOCUMENTS

| JP | H0752389 | 2/1995 |
| JP | 2006192892 | 7/2006 |

(Continued)

OTHER PUBLICATIONS

"International Search Report (Form PCT/ISA/210)", dated May 26, 2015, with English translation thereof, pp. 1-2.
(Continued)

*Primary Examiner* — Stephen Meier
*Assistant Examiner* — John P Zimmermann
(74) *Attorney, Agent, or Firm* — JCIPRNET (57) ABSTRACT

With respect to a configuration for performing printing in an inkjet method, the disclosure implements a more appropriate configuration in which it is difficult for the quantity of printing to deteriorate. This configuration includes a head unit (12), a main scan driver (14), and a controller (20). When main scan operations are performed, the controller (20) performs control with respect to the same area on the medium (50) such that the head unit (12) ejects ink drops of one selected color onto a plurality of first selection pixels selected on the basis of a first mask data item and a plurality of second selection pixels selected on the basis of a second (Continued)

mask data item different from the first mask data item in the arrangement of a plurality of pixels to be selected.

10 Claims, 6 Drawing Sheets

(52) U.S. Cl.
CPC ......... *G06K 15/102* (2013.01); *G06K 15/107* (2013.01); *G06K 2215/0094* (2013.01); *G06K 2215/101* (2013.01)

(56) References Cited

U.S. PATENT DOCUMENTS

| | | | | | |
|---|---|---|---|---|---|
| 7,031,021 | B1* | 4/2006 | Lain | ............... | H04N 1/52 358/1.9 |
| 7,374,280 | B2* | 5/2008 | Kusunoki | ............ | B41J 11/002 347/102 |
| 7,614,713 | B2* | 11/2009 | Marumoto | ............ | G06K 15/107 347/14 |
| 7,896,466 | B2* | 3/2011 | Murayama | ............ | B41J 2/21 347/15 |
| 2002/0149635 | A1* | 10/2002 | Askeland | ............ | B41J 2/2132 347/9 |
| 2005/0219295 | A1* | 10/2005 | Yamazaki | ............ | B41J 2/2132 347/15 |
| 2007/0236525 | A1 | 10/2007 | Noguchi et al. | | |
| 2008/0231904 | A1* | 9/2008 | Suzuki | ............ | B41J 2/1652 358/3.14 |
| 2008/0246793 | A1 | 10/2008 | Seki et al. | | |
| 2009/0073222 | A1* | 3/2009 | Hori | ............ | B41J 2/01 347/33 |
| 2011/0134177 | A1* | 6/2011 | Konno | ............ | B41J 2/2125 347/14 |
| 2011/0181675 | A1* | 7/2011 | Takemoto | ............ | B41J 11/002 347/102 |
| 2013/0182042 | A1 | 7/2013 | Uchida et al. | | |
| 2016/0121620 | A1* | 5/2016 | Yanai | ............ | B41J 2/205 428/195.1 |

FOREIGN PATENT DOCUMENTS

| | | |
|---|---|---|
| JP | 2012144052 | 8/2012 |
| JP | 2012245781 | 12/2012 |

OTHER PUBLICATIONS

"Office Action of China Counterpart Application", dated Mar. 14, 2017, with English translation thereof, p. 1-p. 16.
"Search Report of Europe Counterpart Application", dated Feb. 17, 2017, p. 1-p. 7, in which the listed references were cited.

* cited by examiner

PRINTING APPARATUS AND PRINTING METHOD

CROSS-REFERENCE TO RELATED APPLICATION

This application is a 371 application of the International PCT application serial no. PCT/JP2015/056610, filed on Mar. 6, 2015, which claims the priority benefits of Japan Patent Application No. 2014-045620, filed on Mar. 7, 2014 and Japan Patent Application No. 2015-022839, filed on Feb. 9, 2015. The entirety of each of the above-mentioned patent applications is hereby incorporated by reference herein and made a part of this specification.

TECHNICAL FIELD

The disclosure relates to a printing apparatus and a printing method.

BACKGROUND ART

Inkjet printers for performing printing in an inkjet scheme according to the related art are being widely used. Also, as a method of performing printing by an inkjet printer, a method of performing main scan operations (scanning operations) of moving an inkjet head in a predetermined main scan direction is widely used.

For example, with respect to pixels for which ink drops should be ejected during each main scan operation, some inkjet printers select some of the pixels on the basis of a preset mask data item (a mask). However, in this case, the pattern or the like of the mask data item may cause the quantity of printing to deteriorate. Specifically, for example, in a printed image, a pattern corresponding to the pattern of the mask data item may be seen. Particularly, for example, in a case of blotting out a certain area, this problem easily occurs.

Also, for example, in a case of using, as the pattern of the mask data item, a pattern in which a spatial frequency characteristic of an arrangement of pixels which are selected is one-sided on the low frequency side (a low-frequency mask pattern), in a printed image, granularity may increase. Also, in a case of using, as the pattern of the mask data item, a pattern in which the spatial frequency characteristic of an arrangement of pixels which are selected is one-sided on the high frequency side (a high-frequency mask pattern), the degree of tolerance for deviation in the landing positions of ink drops may decrease. Further, as the result, for example, in a case where deviation in the landing positions of ink drops occurs, a stripe pattern or the like may be easily generated.

In regard to this point, there has been proposed a technology for generating an image by performing thinning using a plurality of patterns, and calculating the frequency characteristic information of the generated thinned image, and selecting a pattern to be applied, on the basis of the calculated frequency information (for example, PTL 1).

However, even according to this technology, in a case of blotting out an area in a single same color, stripes may appear.

CITATION LIST

Patent Literature

PTL 1: JP-A-2012-245781

SUMMARY OF DISCLOSURE

Technical Problem

For this reason, with respect to a configuration for performing printing in an inkjet method, a more appropriate configuration in which it is difficult for the quantity of printing to deteriorate has been desired. Therefore the disclosure provides a printing apparatus and a printed matter capable of solving the above described problems.

Solution to Problem

By earnest researches, the inventor of this application thought of a method of using a plurality of mask data items having different patterns with respect to each color to be used in printing. Also, the inventor found that such method makes it possible to appropriately suppress a problem that the quantity of printing deteriorates due to the pattern of a mask data item or the like. Accordingly, the disclosure has the following configurations.

A printing apparatus according to the disclosure is a printing apparatus for performing printing on a medium in an inkjet method, including: a head unit having nozzle rows for ejecting ink drops onto the medium; a main scan driver configured to drive the head unit to perform main scan operations of ejecting ink drops from nozzles while moving in a predetermined main scan direction; and a controller configured to control the operations of performing printing on the medium by controlling the operations of the head unit and the main scan driver. The controller controls the head unit such that the head unit performs main scan operations. In this case, ink drops are ejected from the nozzle rows onto the positions of pixels selected on the basis of preset mask data items. The controller controls the head unit such that, with respect to each position of the medium, the head unit ejects ink drops of one selected color onto a plurality of first selection pixels selected on the basis of a first mask data item and a plurality of second selection pixels selected on the basis of a second mask data item different from the first mask data item in the arrangement of a plurality of pixels which is selected.

In this configuration, for example, with respect to each selected color, a plurality of mask data items different in the arrangement of a plurality of pixels which is selected is used. Therefore, with respect to the arrangement of a plurality of pixels which is selected, it is possible to appropriately suppress the influence of the pattern of each mask data item. Meanwhile, for example, if a plurality of mask data items different in the spatial frequency characteristics of their patterns is used, even in a case where a pattern corresponding to the pattern of any one mask data item is generated in a printed image, it is possible to make the corresponding pattern inconspicuous. Also, in this way, it is possible to appropriately suppress the quantity of printing from deteriorating, for example, due to the pattern of a mask data item or the like. Therefore, according to this configuration, for example, it is possible to make a printer configured to perform printing in the inkjet method suppress deterioration in the quantity of printing.

Also, in this configuration, each position of the medium means, for example, a band-like area (a band area) on the medium over which the head unit passes during each main scan operation. Also, as the patterns of the first mask data item and the second mask data item, more specifically, a high-frequency mask pattern and a low-frequency mask pattern can be used, respectively. According to this configuration, for example, it is possible to implement a configuration utilizing the advantages of the high-frequency mask pattern and the low-frequency mask pattern while remedying their disadvantages.

Also, the printing apparatus may perform printing, for example, using a plurality of colors (such as individual colors C, M, Y, and K). In this case, it is preferable that the controller should use the first mask data item and the second mask data item with respect to each color.

Also, in the configuration of the printing apparatus, with respect to deterioration in the quantity of printing which occurs due to the pattern of a mask data item or the like, for example, some colors of the plurality of colors may become particularly a problem. More specifically, for example, on an upper surface or a lower surface of an image layer formed by performing color printing with ink of C, M, Y, and K, an ink layer (hereinafter, referred to as a single-color layer) may be formed in a single color such as white to blot out an area. In this case, with respect to the color for the single-color layer, deterioration in the quantity of printing which is caused by the pattern of a mask data item or the like may become a problem. For this reason, in this case, for example, only with respect to some colors, such as white, of the plurality of colors which is used in printing, the first mask data item and the second mask data item may be used. In this case, with respect to the other colors, only one mask data item may be used. Even in this configuration, for example, with respect to a configuration for performing printing in the inkjet method, it is possible to appropriately implement a configuration in which it is difficult for the quantity of printing to deteriorate.

The one selected color is a color for blotting out a predetermined area. More specifically, the selected color is, for example, white. According to this configuration, it is possible to appropriately implement a configuration in which it is difficult for the quantity of printing to deteriorate for example, in a case of forming a single-color layer.

The head unit has a first nozzle row which is a nozzle row of a plurality of nozzles configured to eject ink drops of one color and arranged side by side in a sub scan direction perpendicular to the main scan direction, and a second nozzle row which is a nozzle row of a plurality of nozzles configured to eject ink drops of the same color as that of the first nozzle row and arranged side by side in the sub scan direction. The first nozzle row and the second nozzle row are arranged side by side in the main scan direction. During each main scan operation, the controller performs control such that the nozzles of the first nozzle row eject ink drops onto the first selection pixels and the nozzles of the second nozzle row eject ink drops onto the second selection pixels.

In this configuration, with respect to one selected color, a plurality of nozzle rows is used to eject ink drops. Also, by setting different arrangements for selecting a plurality of pixels with respect to the individual nozzle rows, respectively, it is possible to appropriately suppress the influence of the pattern of each mask data item. Therefore, according to this configuration, it is possible to appropriately suppress the quantity of printing from deteriorating, for example, due to the pattern of a mask data item or the like.

Also, the first nozzle row and the second nozzle row are formed, for example, such that their positions in the sub scan direction are aligned. According to this configuration, for example, it is possible to appropriately eject ink drops onto the same area of the medium by the first nozzle row and the second nozzle row during each main scan operation. Also, the first nozzle row and the second nozzle row may be formed such that their positions in the sub scan direction are deviated, for example, by a distance of a nozzle pitch or less. Even in this case, during each main scan operation, ink drops are ejected onto the same band area by the first nozzle row and the second nozzle row. Therefore, even in this configuration, it is possible to appropriately eject ink drops onto the same area of the medium by the first nozzle row and the second nozzle row during each main scan operation.

Also, for example, with respect to every color which is used in printing, the head may have a first nozzle row and a second nozzle row. According to this configuration, for example, with respect to all colors, it is possible to appropriately suppress the quality of printing from deteriorating due to the pattern of a mask data item or the like. Also, for example, in a case where deterioration in the quantity of printing becomes particularly a problem with respect to specific colors, the head unit may have a first nozzle row and a second nozzle row only with respect to each of some colors (such as white) of the colors which are used in printing. In this case, with respect to the other colors, the head unit may have only one nozzle row.

In the case where the head has the first nozzle row and the second nozzle row, and with respect to one selected color, the first nozzle row ejects ink drops on the basis of the first mask data item, and the second nozzle row ejects ink drops on the basis of the second mask data item as described above, the nozzles of the first nozzle row and the second nozzle row can eject ink drops of ultraviolet curing ink. In this case, the printing apparatus further includes an ultraviolet light source for irradiating ink on the medium with ultraviolet light, and during each main scan operation, the ultraviolet light source radiates ultraviolet light onto ink dots formed on the medium.

By earnest researches, the inventor of this application found that, for example, in a case of performing printing using ultraviolet curing ink, even if a plurality of mask data items different in the arrangement of a plurality of pixels which is selected is used with respect to one selected color, it may be difficult to utilize the advantages of their mask patterns. More specifically, the inventor found that, for example, in a case of performing ink drop ejection based on the first mask data item and ink drop ejection based on the second mask data item with respect to the same area on the medium during different main scan operations, respectively, hardened streaks or the like to be a stripe pattern may be formed.

Also, according to more earnest researches, for the above described reason, in a case of using ultraviolet curing ink and irradiating ink with ultraviolet light during each main scan operation, even if different mask data items are used during different main scan operations, respectively, after ink dots formed in a previous main scan operation hardens, the next main scan operation is performed. Therefore, in this case, it can be said that the surface state of the medium is reset whenever each main scan operation is performed, and it may be impossible to make the features of the different mask data items sufficiently mix together. Also, as a result, even if a plurality of different mask data items is used, it may be difficult to implement a configuration utilizing their advantages while remedying their disadvantages.

In contrast with this, in the above described configuration, since ink drops are ejected by the first nozzle row and the second nozzle row during each main scan operation, with respect to the same area on the medium, during one main scan operation, it is possible to use a plurality of different mask data items. Therefore, according to this configuration, it is possible to more appropriately implement a configuration using a plurality of mask data items, and utilizing their advantages of the mask data items while remedying their disadvantages, for example, even in a case where the ultraviolet light source performs irradiation with ultraviolet light during each main scan operation.

The head unit has a nozzle row composed of a plurality of nozzle rows configured to eject ink of the same color and arranged side by side in the sub scan direction perpendicular to the main scan direction. The controller controls the head unit such that the head unit performs a plurality of main scan operations on the same area of the medium. The controller performs control such that, during the first main scan operation of the plurality of main scan operations, ink drops are ejected from the nozzle row on the basis of the first mask data item. The controller performs control such that, during a subsequent main scan operation, ink drops are ejected from the nozzle row on the basis of the second mask data item.

According to this configuration, for example, it is possible to appropriately perform printing on each position of the medium on the basis of each of the first mask data item and the second mask data item. Also, in this way, it is possible to appropriately suppress the quantity of printing from deteriorating, for example, due to the pattern of a mask data item or the like.

Also, the printing apparatus may perform printing on a medium, for example, in a multi-pass mode for performing a plurality of main scan operations corresponding to a plurality of printing passes on each position of the medium. In this case, the controller controls each nozzle row of the head unit, for example, such that the corresponding nozzle row ejects ink drops onto first selection pixels during a main scan operation corresponding to the first printing pass, and ejects ink drops onto second selection pixels during a subsequent main scan operation corresponding to another printing pass.

Each nozzle of the nozzle row ejects ink drops of ink which is fixed on the medium by drying. In this case, it is preferable that the printing apparatus should further include a component for heating media, for example, a heater.

In a case of performing ink-drop ejecting operations based on a plurality of different mask data items on each position of the medium during different main scan operations, respectively, in case of some types of ink, it may be impossible to sufficiently obtain the effect of use of a plurality of mask data items. In contrast with this, in the case of using ink which is fixed on a medium by drying as described above, for example, before ink dots formed during a previous main scan operation are completely dried, it is possible to appropriately perform the next main scan operation.

Therefore, in this case, even in a case of performing ink-drop ejecting operations based on a plurality of different mask data items during different main scan operations, respectively, it is possible to appropriately obtain the effect of use of a plurality of mask data items. Therefore, according to this configuration, for example, it is possible to more appropriately implement a configuration using a plurality of mask data items, and utilizing their advantages while remedying their disadvantages.

The ink is solvent ink containing a volatile organic solvent as its main component. In this case, the solvent ink is ink which is fixed on media by drying. Therefore, in this configuration, even in a case of performing ink-drop ejecting operations based on a plurality of different mask data items during different main scan operations, respectively, it is possible to appropriately obtain the effect of use of a plurality of mask data items. Also, as a result, for example, it is possible to more appropriately implement a configuration using a plurality of mask data items, and utilizing their advantages while remedying their disadvantages.

The spatial frequency characteristic of the pixel arrangement of the plurality of second selection pixels is different from the spatial frequency characteristic of the pixel arrangement of the plurality of first selection pixels. According to this configuration, for example, it is possible to appropriately set the pixel arrangement of first selection pixels and the pixel arrangement of second selection pixels different from each other. Also, in this way, it is possible to more appropriately suppress the quantity of printing from deteriorating, for example, due to the pattern of a mask data item or the like.

The pattern of one of the first mask data item and the second mask data item is a high-frequency mask pattern having a spatial frequency characteristic one-sided on the high frequency side, and the pattern of the other is a low-frequency mask pattern having a spatial frequency characteristic one-sided on the low frequency side. According to this configuration, for example, it is possible to appropriately set the pixel arrangement of first selection pixels and the pixel arrangement of second selection pixels different from each other. Also, in this way, it is possible to more appropriately suppress the quantity of printing from deteriorating, for example, due to the pattern of a mask data item or the like.

A printing method according to the disclosure includes: a step of ejecting ink drops of one selected color from a head onto pixels of a predetermined area of the medium selected on the basis of a first mask data item; and a step of ejecting ink drops of the same color as that of the ink drops associated with the first mask data item, from the head onto pixels of the same area as the predetermined area selected on the basis of a second mask data item different from the first mask data item. According to this configuration, for example, it is possible to achieve the same effects as those of the first configuration.

Advantageous Effects of Disclosure

According to the disclosure, for example, with respect to a configuration for performing printing in an inkjet method, it is possible to implement a more appropriate configuration in which it is difficult for the quantity of printing to deteriorate.

DESCRIPTION OF EMBODIMENTS

Figure 1A:
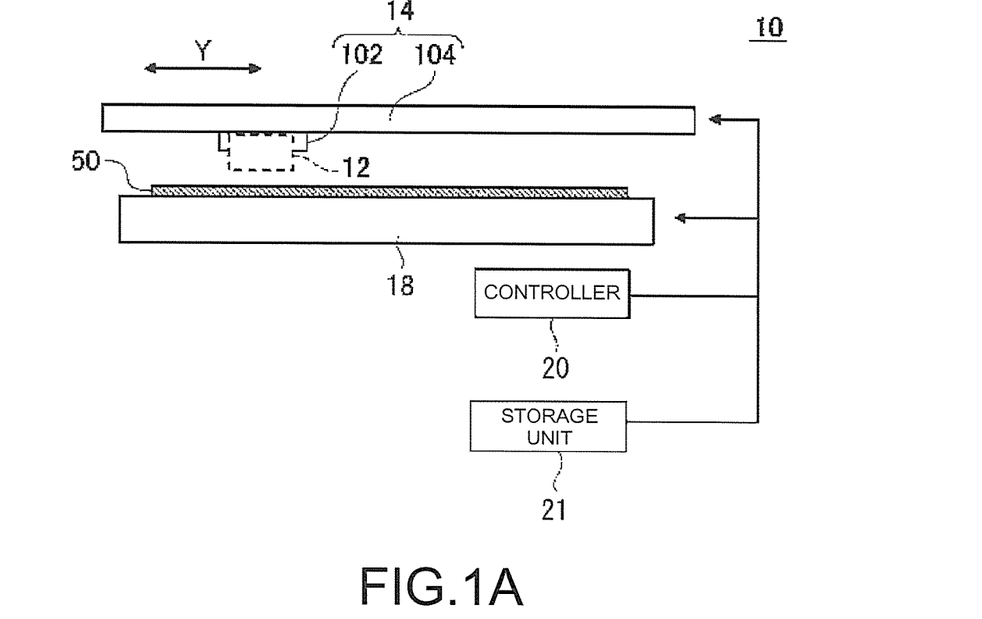
FIGS. 1A and 1B are views illustrating an example of a printing apparatus according to an embodiment of the disclosure.
Figure 1B:
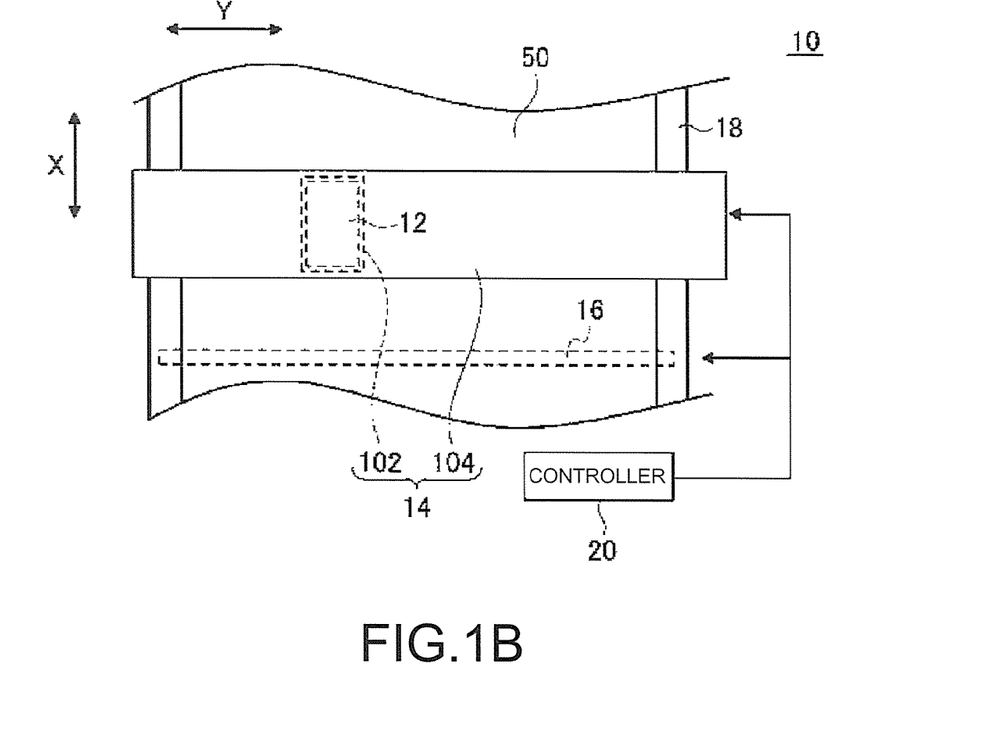

Hereinafter, a printing apparatus 10 according to an embodiment of the disclosure will be described with reference to the accompanying drawings. FIGS. 1A and 1B are views illustrating an example of the printing apparatus according to the embodiment of the disclosure. FIG. 1A is a front view of the printing apparatus 10. FIG. 1B is a plan view of the printing apparatus 10. Also, the printing device 10 may have a configuration identical or similar to that of a known inkjet printer, except for points to be described below.

The printing apparatus 10 is an inkjet printer for performing printing in a serial mode in which an inkjet head performs main scan operations (scanning operations). Also, in the present embodiment, the printing apparatus 10 is an inkjet printer (a UV printer) for performing printing on media 50 with ultraviolet curing ink in an inkjet method, and includes a head unit 12, a main scan driver 14, a sub scan driver 16, a platen 18, a storage unit 21, and a controller 20.

The head unit 12 is a part for performing printing on media 50, and forms ink dots corresponding to the individual pixels of print images on the media 50, in response to instructions of the controller 20. The storage unit 21 stores mask data items. In the present embodiment, the head unit 12 performs printing on a medium 50 by performing main scan operations of ejecting ink drops onto the medium 50 while moving in a predetermined main scan direction (a Y direction in the drawings). Also, the head unit 12 includes components such as a plurality of inkjet heads 202 and ultraviolet light sources 204. In this case, a case where the head unit 12 performs main scan operations means, for example, a case where the inkjet heads 202 of the head unit perform main scan operations. The configuration, operation, and the like of the head unit 12 will be described below in more detail and more specifically.

The main scan driver 14 drives the head unit 12 to perform main scan operations. In the present embodiment, the main scan driver 14 includes a carriage 102 and a guide rail 104. The carriage 102 holds the head unit 12 such that the nozzle rows of the inkjet heads face the medium 50. The guide rail 104 guides movement of the carriage 102 in the main scan direction. The main scan driver 14 moves the carriage 102 in the main scan direction in response to instructions of the controller 20.

The sub scan driver 16 performs sub scan operations of relatively moving the medium 50 in a sub scan direction (an X direction in the drawings) perpendicular to the main scan direction. The sub scan driver 16 includes a roller configured to convey the medium 50. Whenever the main scan driver 14 performs a predetermined number of main scan operations, the sub scan driver 16 performs a sub scan operation by controlling the roller such that the roller rotates to convey the medium 50 by a predetermined amount.

Also, for example, it can be considered to use a configuration for performing sub scan operations by moving the inkjet head side with respect to a medium 50 fixed in place (for example, an X-Y table type apparatus), without conveying the medium 50, as the configuration of the printing apparatus 10. In this case, the sub scan driver 16 includes a component for moving the inkjet heads by moving the guide rail 104 in the sub san direction, for example, a driver.

The platen 18 is a board-like member for mounting a medium 50, and is disposed so as to face the surfaces of the inkjet heads 202 of the head unit 12 where nozzle rows 302 are formed, with a medium conveyance path interposed therebetween. Also, the controller 20 is, for example, a CPU (central processing unit) of the printing apparatus 10, and controls the operation of each unit of the printing apparatus 10, for example, in response to instructions of a host PC (personal computer). According to the above described configuration, the printing apparatus 10 performs printing on each medium 50.

Figure 2A:
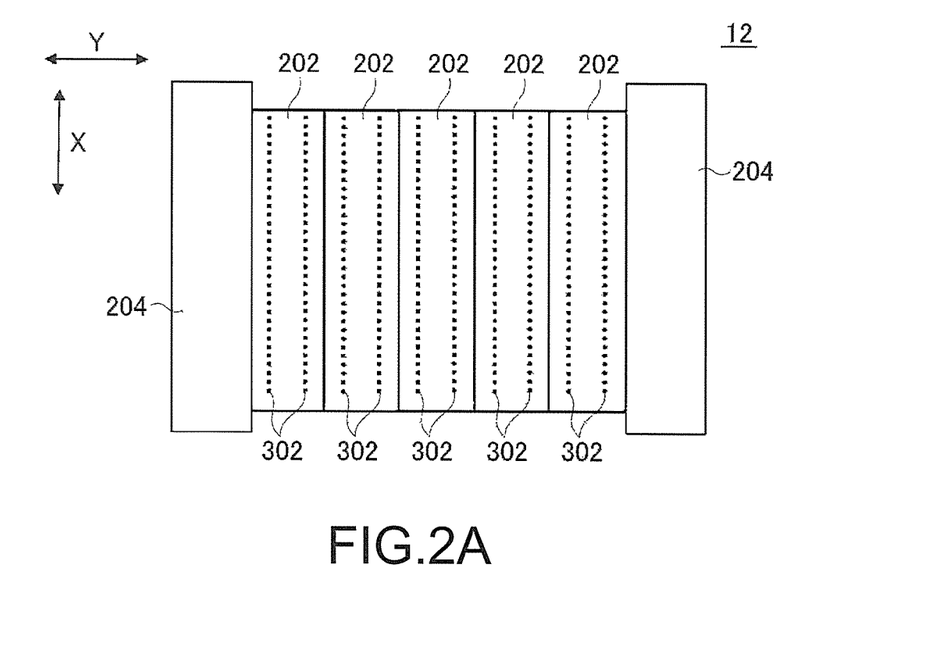
FIGS. 2A and 2B are views illustrating an example of a more detailed configuration of a head unit.
Figure 2B:
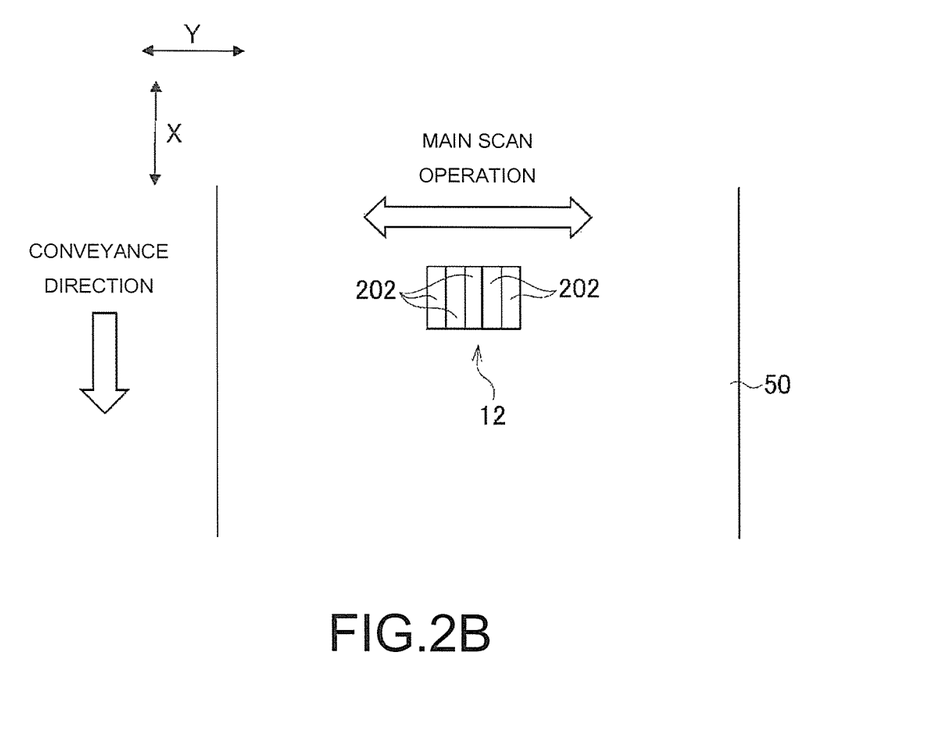

Now, a more specific configuration of the head unit 12 will be described in detail. FIGS. 2A and 2B show an example of a more detailed configuration of the head unit 12. FIG. 2A is a bottom view illustrating the configuration of the head unit 12.

In the present embodiment, the head unit 12 includes the plurality of inkjet heads 202 for ejecting ink drops of different colors, and the plurality of ultraviolet light sources 204. For example, the plurality of inkjet heads 202 is inkjet heads for individual colors C (cyan), M (magenta), Y (yellow), and K (black) and an inkjet head 202 for a special color which is a color other than C, M, Y, and K. More specifically, for example, the head unit 12 includes an inkjet head 202 for white, as an inkjet head 202 for a special color.

Also, for example, the plurality of inkjet heads 202 is installed side by side in the main scan direction (the Y direction) such that their positions in the sub scan direction (the X direction) are aligned. Therefore, during each main scan operation, the plurality of individual inkjet heads 202 ejects ink drops of their colors onto the same area of the medium 50. In this case, the same area of the medium 50 means, for example, a band-like area (a band area) on the medium 50 over which the plurality of inkjet heads 202 passes during each main scan operation. Also, in the present embodiment, the head unit 12 performs printing on the medium 50, for example, by performing main scan operations in the outward direction and homeward direction of the main scan direction.

Also, as described above, in FIG. 2A, for convenience of illustration, a configuration in the case of arranging all inkjet heads 202 side by side in the main scan direction such that their positions in the sub scan direction are aligned is shown. However, in another example of the configuration of the head unit 12, for example, it can be considered to install some inkjet heads 202 so as to be deviated from the other inkjet heads 202 in the sub scan direction. For example, it can be considered to install the inkjet head 202 for white so as to be deviated from the inkjet heads 202 for the individual colors of C, M, Y, and K in the sub scan direction. In this case, for example, it is preferable to install the inkjet heads 202 for the individual colors of C, M, Y, and K side by side in the main scan direction such that their positions in the sub scan direction are aligned.

Also, an inkjet head 202 for each color may be, for example, a composite head consisting of a plurality of inkjet heads. For example, each inkjet head 202 may be a stagger head having a plurality of inkjet heads staggered.

Also, in the present embodiment, each inkjet head 202 has a plurality of nozzle rows 302, and ejects ink drops of ultraviolet curing ink from the individual nozzles of the individual nozzle rows 302. Also, in each inkjet head 202, the plurality of nozzle rows 302 is formed side by side in the main scan direction such that their positions in the sub scan direction are aligned.

Also, each nozzle row 302 means, for example, a row of a plurality of nozzles for ejecting ink drops of a single color. In the present embodiment, nozzles constituting each nozzle row 302 are arranged side by side in the sub scan direction. The head unit 12 shown in FIG. 2A has an inkjet head 202 having two nozzle rows 302 for ejecting ink drops of the same color. Also, the head unit may have a plurality of inkjet heads 202 having nozzle rows 302 for ejecting ink drops of the same color. In this case, each inkjet head 202 has, for example, one nozzle row 302.

Also, the plurality of nozzle rows 302 for ejecting ink drops of the same color may be formed such that their positions in the sub scan direction are deviated, for example, by a distance of a nozzle pitch or less. In this case, a nozzle pitch means the interval between neighboring nozzles in one nozzle row 302 (the interval in the sub scan direction). More specifically, for example, in a case where one inkjet head 202 has a plurality of nozzle rows 302 as described above, the plurality of nozzle rows 302 of each individual inkjet head 202 may be formed such that their positions in the sub scan direction are deviated by a distance of the nozzle pitch or less. Also, for example, in a case of using a plurality of inkjet heads 202 with respect to one selected color, the nozzle rows 302 of the individual inkjet head 202 may be formed such that their positions in the sub scan direction are deviated by a distance of the nozzle pitch or less. Even in these cases, during each main scan operation, ink drops are ejected from the plurality of nozzle rows 302 onto the same band area. Therefore, even in these configurations, during each main scan operation, it is possible to appropriately eject ink drops from the plurality of nozzle rows 302 onto the same area of the medium 50.

The plurality of ultraviolet light sources 204 is light sources for irradiating ink on the medium 50 with ultraviolet light. The plurality of ultraviolet light sources 204 is installed with the arrangement of the inkjet heads 202 interposed therebetween, for example, in the main scan direction, such that they are disposed on both sides of the arrangement of the inkjet heads 202, respectively. In this case, during each main scan operation, an ultraviolet light source 204 which is positioned on the rear side of the plurality of inkjet heads 202 in the movement direction of the inkjet heads 202 irradiates ink on the medium 50 with ultraviolet light. According to this configuration, for example, it is possible to appropriately harden ink dots during each main scan operation.

Also, in a modification of the configuration of the head unit 12, as examples of ink which is used in the inkjet heads 202, ultraviolet curing ink, solvent UV ink obtained by diluting ultraviolet curing ink with a volatile organic solvent, solvent ink, and latex ink can be taken. In a case of using solvent UV ink, solvent ink, or latex ink, it is preferable to install a heater or the like inside the platen 18 (see FIGS. 1A and 1B). Also, in a case where ultraviolet curing ink or solvent UV ink is not used, for example, in the configuration of the head unit 12, the ultraviolet light sources 204 may be omitted.

Now, the operation of the head unit 12 during printing will be described in more detail. FIG. 2B is a view illustrating an example of the aspect of the head unit 12 during main scan operations. As described above, in the present embodiment, the head unit 12 performs printing on the medium 50, for example, by performing main scan operations in the outward direction and homeward direction of the main scan direction. Also, in this way, during main scan operations, while the head unit 12 passes over each band area, ink drops of the different colors are ejected from the inkjet heads 202 onto the corresponding band area.

Also, whenever the head unit 12 performs a predetermined number of main scan operations, the sub scan drive unit 16 (see FIGS. 1A and 1B) performs a sub scan operation by conveying the medium 50 in a conveyance direction. In this way, the sub scan drive unit 16 changes areas of the medium 50 to face the head unit 12. Also, thereafter, the head unit 12 performs the next main scan operation on the next band area. According to the present embodiment, it is possible to appropriately perform printing on the entire print area of the medium 50 by repeating main scan operations and sub scan operations.

Also, with respect to the timings of sub scan operations, more specifically, for example, it can be considered to perform one sub scan operation whenever one main scan operation is performed. In this case, in each of an interval between a main scan operation which is performed in the outward direction and a main scan operation which is performed in the homeward direction, and an interval between a main scan operation which is performed in the homeward direction and a main scan operation which is performed in the outward direction, a sub scan operation is performed.

Also, as described above, in the present embodiment, with respect to the individual colors which are used in printing, the head unit 12 has a plurality of nozzle rows 302. Also, during each main scan operation, the plurality of nozzle rows 302 for the individual colors ejects ink drops onto the same area of the medium 50. In this way, during each main scan operation of the present embodiment, with respect to each color which is used in printing, the head unit 12 performs printing on one band area, using the plurality of nozzle rows 302 for the corresponding color. Hereinafter, this operation will be described in more detail.

In the present embodiment, in a case of controlling the head unit 12 such that the head unit performs main scan operations, the controller 20 (see FIGS. 1A and 1B) reads out preset mask data items from the storage unit 21. The controller 20 performs control such that ink drops are ejected from the nozzles of the individual nozzle rows 302 onto the positions of a plurality of pixels selected on the basis of the read mask data items. Also, in this case, with respect to the plurality of nozzle rows 302 for each color, the controller 20 uses different mask data items depending on the nozzle rows 302. More specifically, for example, with respect to a first nozzle row which is one nozzle row of the plurality of nozzle rows 302 for each color, the controller 20 uses a first mask data item. In this way, the controller controls the nozzles of the first nozzle row such that the nozzles eject ink drops onto a plurality of first selection pixels which are pixels selected on the basis of the first mask data item. Also, with respect to a second nozzle row which is the other nozzle row of the plurality of nozzle rows 302, the controller uses a second mask data item different from the first mask data item in the arrangement of a plurality of pixels which is selected. In this way, the controller controls the nozzles of the second nozzle row such that the nozzles eject ink drops onto a plurality of second selection pixels which are pixels selected on the basis of the second mask data item.

In this configuration, with respect to each selected color, a plurality of mask data items different in the arrangement of a plurality of pixels which is selected is used. Therefore, with respect to the arrangement of a plurality of pixels which is selected, it is possible to appropriately suppress the influence of the pattern of each mask data item. More specifically, for example, if a plurality of mask data items different in the spatial frequency characteristics of their patterns is used, even in a case where a pattern corresponding to the pattern of any one mask data item is generated in a printed image, it is possible to make the corresponding pattern inconspicuous. Also, in this way, it is possible to appropriately suppress the quantity of printing from deteriorating, for example, due to the pattern of a mask data item or the like. Therefore, according to the present embodiment, for example, it is possible to make a printer configured to perform printing in the inkjet method suppress deterioration in the quantity of printing.

In this case, the mask data items which are used in the present embodiment may be, for example, data items identical or similar to mask data items (masks) which are used in a multi-pass mode for performing printing by performing a plurality of main scan operations on each band area of a medium 50. In this case, the mask data items which are used in the case of performing printing in the multi-pass mode are, for example, data items for designating pixels to be subjected to ink drop ejection during a main scan operation corresponding to each printing pass. Also, the printing apparatus 10 of the present embodiment may perform printing in the multi-pass mode, for example, using the first mask data item and the second mask data item.

Also, the case where the first mask data item and the second mask data item are different from each other in the arrangement of a plurality of pixels to be selected means, more specifically, for example, a case where the spatial frequency characteristic of the pixel arrangement of a plurality of first selection pixels is different from the spatial frequency characteristic of the pixel arrangement of a plurality of second selection pixels. In this case, as the spatial frequency characteristic of the arrangement of a plurality of pixels, for example, a spatial frequency obtained by performing two-dimensional Fourier transform on the arrangement of pixels selected on the basis of a corresponding mask data item can be used.

Also, as the patterns of the first mask data item and the second mask data item, more specifically, for example, a high-frequency mask pattern and a low-frequency mask pattern can be suitably used, respectively. According to this configuration, for example, it is possible to implement a configuration utilizing the advantages of the high-frequency mask pattern and the low-frequency mask pattern while remedying their disadvantages. More specific examples of the first mask data item and the second mask data item will be described below in more detail.

Until now, the configuration in the case of using a plurality of nozzle rows 302 with respect to every color which is used in printing has been described. In this case, with respect to the plurality of nozzle rows 302 for every color, it is preferable to commonly use the first mask data item and the second mask data item. According to this configuration, for example, with respect to all colors, it is possible to appropriately suppress the quality of printing from deteriorating due to the pattern of a mask data item or the like.

Also, in the printing apparatus 10, with respect to deterioration in the quantity of printing which occurs due to the pattern of a mask data item or the like, for example, some colors of the plurality of colors may become particularly a problem. More specifically, for example, on an upper surface or a lower surface of an image layer formed by performing color printing with ink of C, M, Y, and K, an ink layer (hereinafter, referred to as a single-color layer) may be formed in a single color such as white to blot out an area. In this case, the single-color layer is, for example, a background layer of the image layer which is formed by color printing. Also, an inkjet head 202 for ejecting ink drops for the single-color layer may be installed, for example, on the upstream side or downstream side from the inkjet heads 202 for C, M, Y, and K in the main scan direction.

Further, in this case, for example, with respect to the color for forming the single-color layer, since an ink layer is formed to blot out a predetermined area, deterioration in the quantity of printing which is caused by the pattern of a mask data item or the like may become particularly a problem. For this reason, in this case, for example, only with respect to some colors such as white of the plurality of colors which is used in printing, the first mask data item and the second mask data item may be used. In this case, with respect to each of the other colors, it is possible to use an inkjet head 202 having only one nozzle row 302, and perform printing using only one mask data item by the nozzle row 302. Even in this configuration, for example, with respect to a configuration for performing printing in the inkjet method, it is possible to appropriately implement a configuration in which it is difficult for the quantity of printing to deteriorate.

Now, more specific examples of the first mask data item and the second mask data item will be described. As described above, the first mask data item and the second mask data item are data items identical or similar to mask data items (masks) which are used in a case of performing printing in the multi-pass mode. Also, in this case, more specifically, as the first mask data item and the second mask data item, data items which are obtained by binarizing multi-grayscale data items (hereinafter, referred to as multi-grayscale mask pattern data items) which are data items having multiple preset grayscales can be used. In this case, the multi-grayscale mask pattern data items are, for example, data items representing the pixel values of a plurality of pixels arranged in the main scan direction and the sub scan direction, in multiple grayscales. Also, as the multi-grayscale mask pattern data items which are the origins of the first mask data item and the second mask data item, data items having different spatial frequency characteristics are used. The multi-grayscale mask pattern data items are binarized with a threshold set according to printing conditions and the like, whereby the first mask data item and the second mask data item are generated.

Figure 3A:
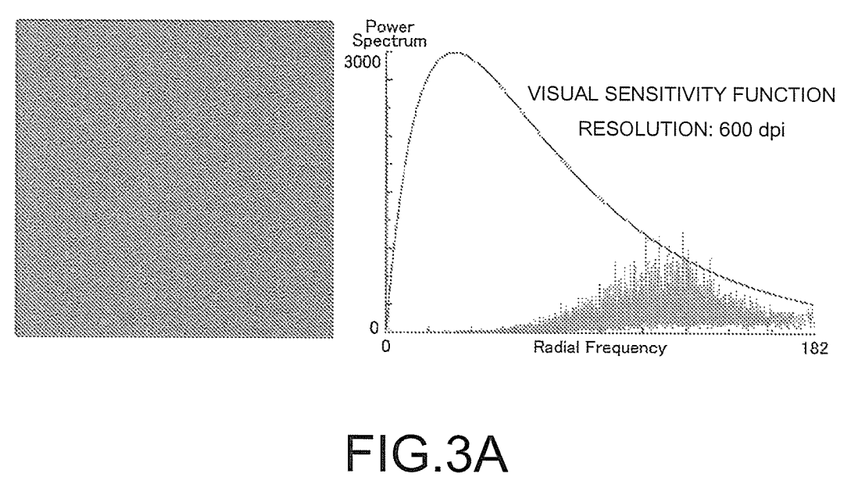
FIGS. 3A and 3B are views illustrating examples of multi-grayscale mask pattern data items corresponding to a first mask data item and a second mask data item, respectively.
Figure 3B:
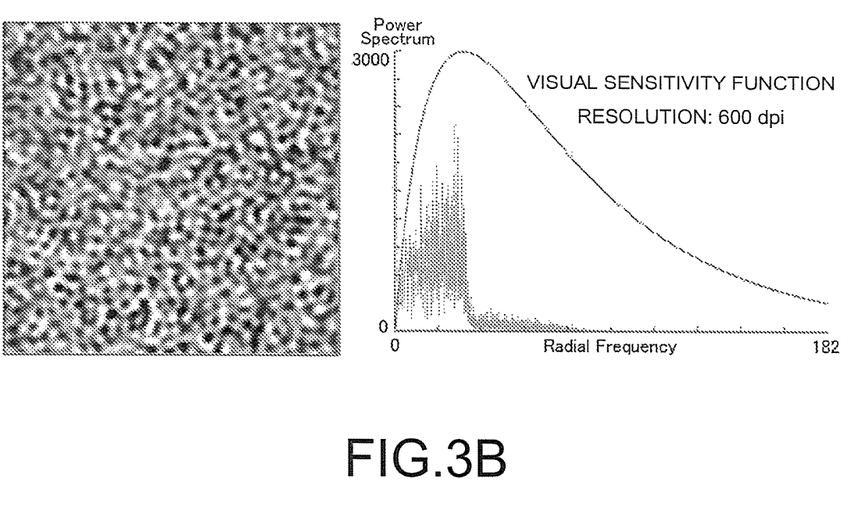

FIGS. 3A and 3B show examples of the multi-grayscale mask pattern data items corresponding to the first mask data item and the second mask data item, respectively. FIG. 3A is a view illustrating an example of a multi-grayscale mask pattern data item corresponding to the first mask data item. FIG. 3B is a view illustrating an example of a multi-grayscale mask pattern data item corresponding to the second mask data item.

In the present embodiment, as the first mask data item, for example, a mask data item having a high-frequency mask pattern (a high-frequency mask data item) is used. In this case, the high-frequency mask pattern means, for example, a mask pattern having a spatial frequency characteristic one-sided on the high frequency side. Also, the mask data item having the high-frequency mask pattern may be, for example, a mask data item generated from a multi-grayscale mask pattern data item having a spatial frequency characteristic close to the high frequency side as shown in FIG. 3A. Also, more specifically, in this case, if the distribution of inter-dot distances which are the intervals between neighboring pixels is obtained in view of the pixel arrangement of a plurality of first selection pixels which is selected on the basis of the first mask data item, spatial frequencies corresponding to 80% or more of all inter-dot distances are higher than the peak frequency of a visual sensitivity function. In this case, the peak frequency of the visual sensitivity function means, for example, the peak frequency of a visual sensitivity function at a resolution set for printing.

Also, as the second mask data item, for example, a mask data item having a low-frequency mask pattern (a low-frequency mask data item) is used. In this case, the low-frequency mask pattern means, for example, a mask pattern having a spatial frequency characteristic one-sided on the low frequency side. Also, the mask data item having the low-frequency mask pattern may be, for example, a mask data item generated from a multi-grayscale mask pattern data item having a spatial frequency characteristic one-sided on the low frequency side as shown in FIG. 3B. Also, more specifically, in this case, if the distribution of inter-dot distances is obtained in view of the pixel arrangement of a plurality of second selection pixels selected on the basis of the second mask data item, spatial frequencies corresponding to 80% or more of all inter-dot distances are lower than the peak frequency of the visual sensitivity function.

According to this configuration, for example, it is possible to appropriately set the pixel arrangement of first selection pixels and the pixel arrangement of second selection pixels different from each other. Also, in this way, it is possible to more appropriately suppress the quantity of printing from deteriorating, for example, due to the pattern of a mask data item or the like.

Figure 4:
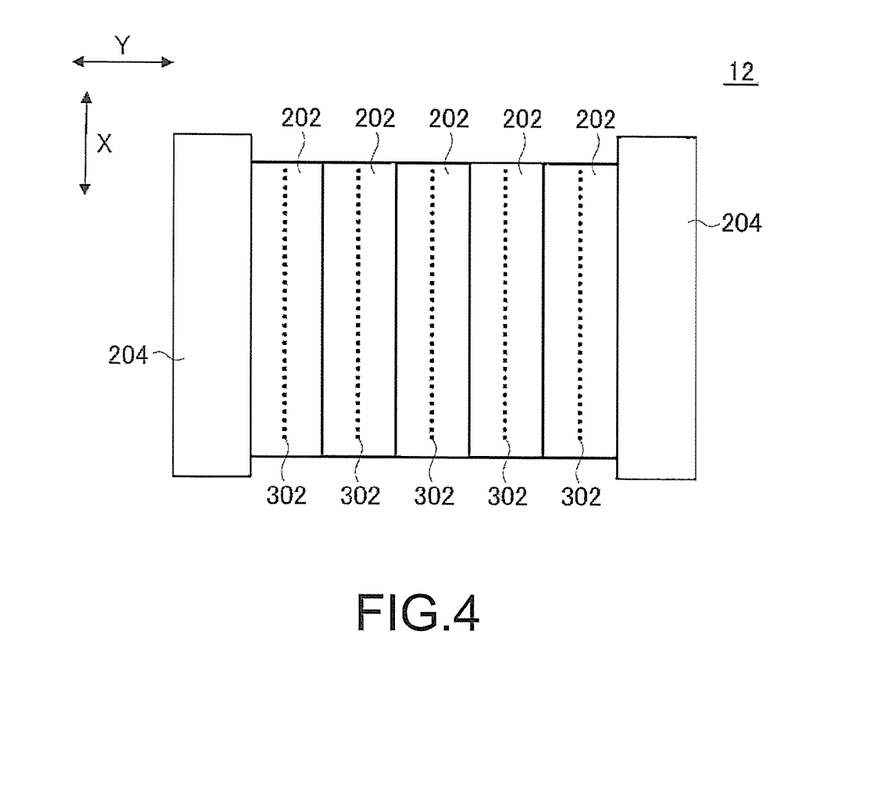
FIG. 4 is a view illustrating an example of the configuration of a modification of the head unit.

Now, a modification of the configuration of the head unit 12 will be described. FIG. 4 shows an example of the configuration of the modification of the head unit 12. Except for points to be described below, components of FIG. 4 denoted by the same reference symbols as those of FIG. 1A through FIG. 3B have features identical or similar to those of the components of FIG. 1A through FIG. 3B.

Even in this modification, the head unit 12 includes the plurality of inkjet heads 202 for ejecting ink drops of different colors, respectively, and the plurality of ultraviolet light sources 204. Also, in the present modification, each inkjet head 202 has one nozzle row 302. Also, in the present modification, the controller 20 (see FIGS. 1A and 1B) controls the head unit 12 such that the head unit performs a plurality of main scan operations on each position of a medium 50. Also, more specifically, for example, the printing apparatus 10 (see FIGS. 1A and 1B) performs printing on each position of the medium 50 in the multi-pass mode by such a plurality of main scan operations.

Also, in the present modification, the printing apparatus 10 sets a mask data item for some main scan operations of a plurality of main scan operations different from a mask data item for the other main scan operations. More specifically, during a certain main scan operation of a plurality of main scan operations which is performed on one area of the medium 50, the controller 20 performs control such that ink drops are ejected from the nozzles of the nozzle rows 302 of the inkjet head 202 onto first selection pixels selected on the basis of the first mask data item. Thereafter, during another main scan operation which is performed on the same area, the controller 20 performs control such that ink drops are ejected from the nozzles of the same nozzle rows 302 onto second selection pixels selected on the basis of the second mask data item.

Even in this configuration, for example, it is possible to appropriately perform printing based on the first mask data item and the second mask data item, on each position of the medium 50. Also, in this way, it is possible to appropriately suppress the quantity of printing from deteriorating, for example, due to the pattern of a mask data item or the like.

Also, in the above described operations, the certain main scan operation may be, for example, a main scan operation which is performed in any one direction of the outward direction and the homeward direction. Also, the another main scan operation may be, for example, a main scan operation which is performed in the opposite direction to that of the certain main scan operation. Also, the another main scan operation may be the next main scan operation of the certain main scan operation. Also, in this configuration, for example, it is possible to use a high-frequency mask pattern as the pattern of one of the first mask data item and the second mask data item, and use the low-frequency mask pattern as the pattern of the other of the first mask data item and the second mask data item. According to this configuration, for example, it is possible to appropriately set the pixel arrangement of first selection pixels and the pixel arrangement of second selection pixels different from each other.

Until now, the case where ultraviolet curing ink (UV ink) is used in the head unit 12 has been mainly described. However, as described above, in a modification of the configuration of the head unit 12, ink other than ultraviolet curing ink may be used as ink which is used in the inkjet heads 202. Also, in each of a case of using ultraviolet curing ink and a case of using ink other than ultraviolet curing ink, it is preferable to appropriately modify the configuration and operation of the head unit 12 according to the property of the ink which is used.

Figure 5A:
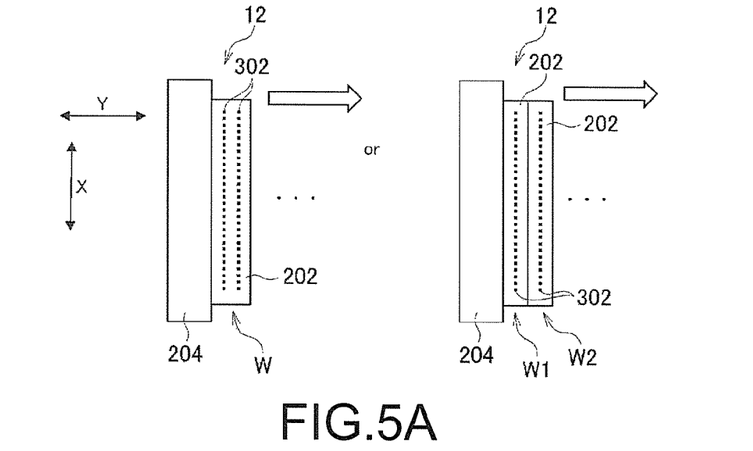
FIGS. 5A, 5B and 5C are views for explaining the relation between a desirable configuration and operation of the head unit and the property of ink which is used.
Figure 5B:
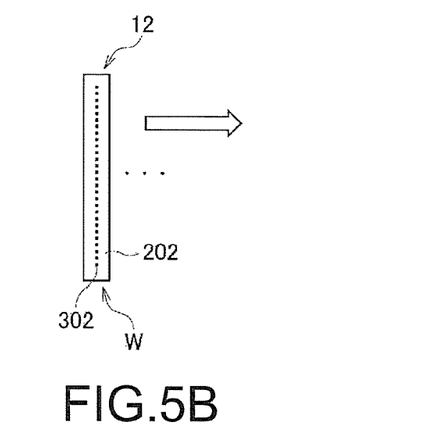
Figure 5C:
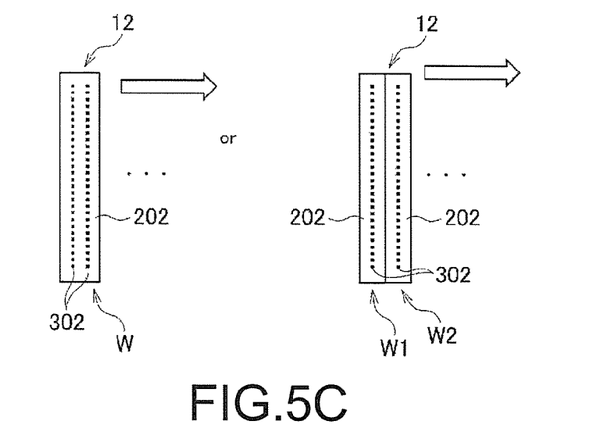

For this reason, hereinafter, the relation between a desirable configuration and operation of the head unit 12 and the property of ink which is used will be described in more detail. FIGS. 5A to 5C are views for explaining the relation between the desirable configuration and operation of the head unit 12 and the property of ink which is used.

In each example to be described below, the head unit 12 includes, at least an inkjet head 202 for white (W) ink. In this case, white ink is an example of a color which is used to blot out a predetermined area, and is used to form an ink layer in a single color (a single-color layer) to blot out an area. Also, the head unit 12 may further include inkjet heads 202 for ink of other colors (such as the individual colors of C, M, Y, and K).

Also, as described above, with respect to deterioration in the quantity of printing which is caused by the pattern of a mask data item or the like, for example, ink having a color such as white which is used to blot out a predetermined area is likely to be a problem. For this reason, hereinafter, for convenience of explanation, a desirable configuration and operation for the inkjet head 202 for white ink will be described. The configurations and operations of the inkjet heads 202 for ink of the other colors may be the same as those of the inkjet head 202 for white ink. Also, for example, with respect to each of the other colors, it is possible to perform printing with only one common mask data item by one nozzle row 302.

FIG. 5A shows an example of a desirable configuration and operation of the head unit 12 in a case of using ultraviolet curing ink. In this case, the head unit 12 includes an ultraviolet light source 204 in addition to the inkjet heads 202. Also, during each main scan operation, the ultraviolet light source 204 radiates ultraviolet light onto ink dots formed on a medium.

Also, in this case, in the head unit 12, the inkjet head 202 for white ink has a plurality of (for example, two) nozzle rows 302 arranged side by side in the main scan direction, for example, as shown on the left portion of FIG. 5A. In this case, the plurality of nozzle rows 302 is examples of a first nozzle row and a second nozzle row, respectively. Also, this configuration may be, for example, a configuration identical or similar to that of the head unit 12 shown in FIG. 2A.

Also, in this case, in a way identical or similar to that in the case described in association with FIG. 2A, during each main scan operation, one of the two nozzle rows 302 for white ink ejects ink drops on the basis of the preset first mask data item. Also, the other nozzle row 302 ejects ink drops on the basis of the second mask data item different from the first mask data item. Further, as the patterns of the first mask data item and the second mask data item, for example, a high-frequency mask pattern and a low-frequency mask pattern are used, respectively.

In this configuration, in a case of using a plurality of mask data items and utilizing the advantages of their mask patterns, with respect to a plurality of main scan operations to be performed on the same position, for example, it can also be considered to set a mask data item for some main scan operations different from a mask data item for the other main scan operations, as described with reference to FIG. 4. However, in a case of using ultraviolet curing ink and irradiating ink with ultraviolet light during each main scan operation, even if different mask data items are used during different main scan operations, respectively, after ink dots formed in a previous main scan operation harden, the next main scan operation is performed. For this reason, in this case, it may be impossible to make the features of the different mask data items sufficiently mix together. Further, as a result, even if a plurality of mask data items is used, it may be difficult to implement a configuration utilizing the features of the mask data items while remedying their disadvantages. Also, the features of the mask data items may cause hardened streaks or the like to be a stripe pattern.

In contrast with this, for example, in the configuration shown in FIG. 5A, during each main scan operation, it is possible to use a plurality of nozzle rows 302 with respect to one selected color (such as white), and apply different mask patterns to those nozzle rows 302, respectively. In this way, for example, with respect to the same area on the medium, during one main scan operation, it is possible to use a plurality of different mask data items. Also, in this case, since the plurality of nozzle rows 302 ejects ink drops onto each area before irradiation with ultraviolet light, it is possible to make the features of the different mask data items sufficiently mix together. Therefore, according to this configuration, for example, it is possible to more appropriately implement a configuration using a plurality of mask data items and utilizing the advantages of the mask data items while remedying the disadvantages of the mask data items even in a case where the ultraviolet light source performs irradiation with ultraviolet light during each main scan operation. Therefore, it can be said that, in a case of using ultraviolet curing ink, it is particularly preferable to use the above described configuration.

Also, as described above in association with FIGS. 2A and 2B and the like, a plurality of nozzle rows 302 for ejecting ink drops of a single color does not necessarily need to be formed in the same inkjet head 202, and the nozzle rows 302 may be formed in different inkjet heads 202, respectively, as shown in FIG. 5A. More specifically, for example, as shown by reference symbols W1 and W2 in FIGS. 5A to 5C, a plurality of inkjet heads 202, each having one nozzle row 302, may be used as inkjet heads 202 for white ink. In this case, the plurality of inkjet heads 202 can be installed side by side in the main scan direction, such that their positions in the sub scan direction are aligned. Even in this case, since the configuration is substantially the same as the configuration shown on the left portion in FIG. 5A, this configuration is preferable, particularly, in a case of using ultraviolet curing ink.

Now, a case of using ink other than ultraviolet curing ink will be described. In the inkjet heads 202 of the head unit 12, besides ultraviolet curing ink, for example, ink which is fixed on media by drying may be used. Also, as this type of ink, more specifically, for example, solvent ink may be used.

FIG. 5B shows an example of a configuration and operation of the head unit 12 desirable in a case of using solvent ink. In this case, solvent ink means, for example, ink containing a volatile organic solvent as its main component. Also, in this case, for example, it is preferable that the printing apparatus 10 should further include a component for heating media, such as a heater. Also, the configuration and the operation to be described below are not limited to the case of using solvent ink, and are preferable even in cases of using various types of ink which are fixed on media by drying (for example, latex ink).

In a case of using ink such as solvent ink which is fixed on media by drying, for example, before ink dots formed during a previous main scan operation are completely dried, it is possible to appropriately perform the next main scan operation. Therefore, in this case, even in a case of performing ink-drop ejecting operations based on a plurality of different mask data items during different main scan operations, respectively, it is possible to more appropriately implement a configuration using the plurality of mask data items, and utilizing the advantages of the mask data items while remedying the disadvantages of the mask data items.

Also, in this case, since it is not essential to use a plurality of nozzle rows 302 with respect to a single color, for example, in FIG. 5B, in the head unit 12, the number of nozzle rows 302 for each color may be one. Therefore, in this case, it is possible to further simplify the configuration of the head unit 12. Therefore, it can be said that it is preferable to use such configuration, particularly, in the case of using solvent ink or the like.

Also, the configuration and the operation shown in FIG. 5B may be, for example, a configuration and an operation obtained by partially modifying the configuration and the operation described in association with FIG. 4 in accordance with a difference of the features of ink to be used. More specifically, for example, it can be considered to exclude the ultraviolet light sources 204 from the head unit 12 having the configuration shown in FIG. 4, and perform heating by a heater, instead of performing irradiation with ultraviolet light by the ultraviolet light sources 204.

Also, even in a case of using solvent ink or the like, with respect to a single color, a plurality of nozzle rows 302 may be used. FIG. 5C shows other examples of a desirable configuration and operation of the head unit 12 in the case of using solvent ink.

In a case of using ink which is fixed on media by drying, like solvent ink, for example, similarly to the case described with reference to FIG. 5A, it can be considered to use a plurality of nozzle rows 302 with respect to a single color, and apply different mask patterns to those nozzle rows 302, respectively. Even in this case, it is possible to more appropriately implement a configuration using a plurality of mask data items, and utilizing the advantages of the mask data items while remedying their disadvantages. Therefore, it can be said that the configuration and the operation as described above are preferable in the case of using solvent ink or the like.

Also, in this case, as a specific configuration, for example, it can be considered to form a plurality of nozzle rows 302 in one inkjet head 202 as shown in the left portion of FIG. 5C. Also, it can be considered to use a plurality of inkjet heads 202, each having one nozzle row 302, as shown in the right portion of FIG. 5C.

Also, in the case of using solvent ink or the like, even in a case of using the head unit 12 having the configuration shown in FIG. 5C, it is possible to perform ink-drop ejecting operations based on a plurality of different mask data items during different main scan operations, respectively, without setting different mask patterns for the nozzle rows 302, respectively. More specifically, for example, it is possible to set a common mask data item with respect to a plurality of nozzle row 302 for each color, in each main scan operation, and set a mask data item for some main scan operations different from a mask data item for other main scan operations. Even in this configuration, it is possible to more appropriately implement a configuration using the plurality of mask data items, and utilizing the advantages of the mask data items while remedying their disadvantages. Therefore, it can be said that the configuration and the operation as described above are preferable in the case of using solvent ink or the like.

Until now, the case of using one mask data item with respect to one nozzle row 302 during each main scan operation has been mainly described. However, in a further modification, for example, it can also be considered to use a plurality of mask data items with respect to one nozzle row 302 during one main scan operation. In this case, for example, it can be considered to virtually divide one nozzle row 302 into a plurality of nozzle rows, and use different mask data items with respect to the virtual nozzle rows, respectively.

Figure 6A:
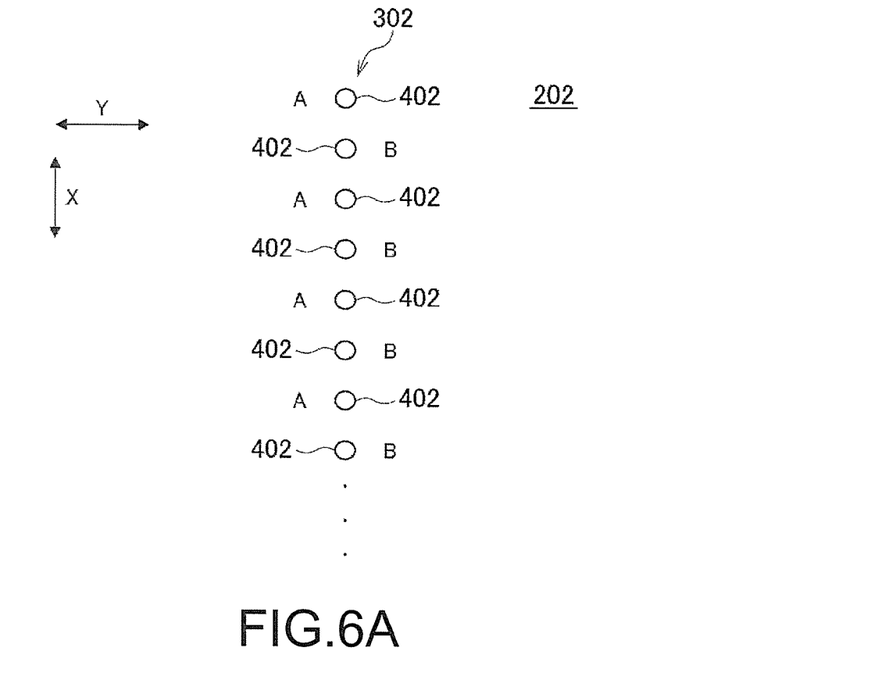
FIGS. 6A and 6B are views for explaining another modification of the head unit 12.
Figure 6B:
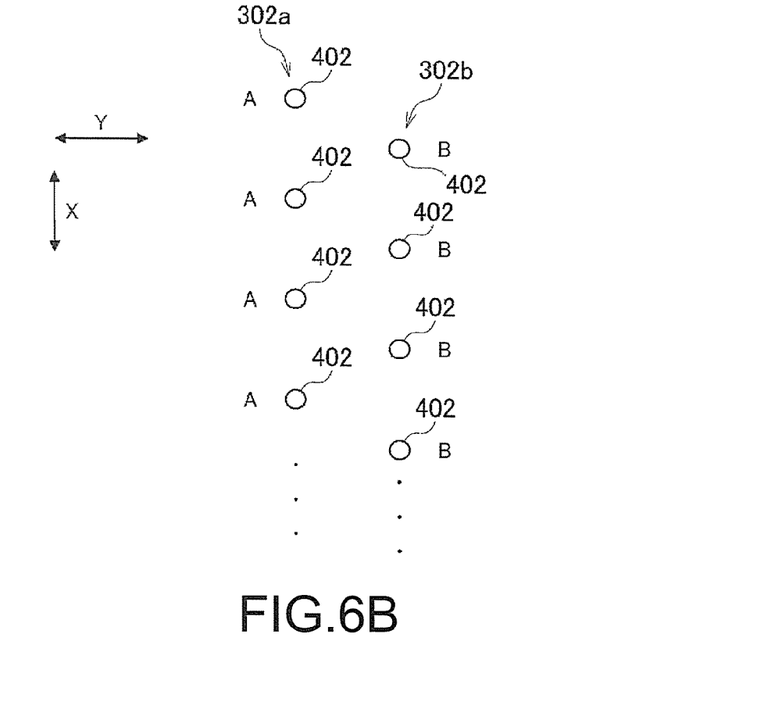

FIGS. 6A and 6B are views for explaining the further modification of the head unit 12 (see FIGS. 1A and 1B). FIG. 6A shows an example of the configuration of an inkjet head 202 included in the head unit 12 according to the present modification. In the present modification, each inkjet head 202 of the head unit 12 has, for example, one nozzle row 302. Also, each nozzle row 302 includes a plurality of nozzles 402 arranged at regular intervals in the sub scan direction (the X direction). Also, in this case, the plurality of nozzles 402 of each nozzle row 302 ejects ink drops of the same color.

In FIG. 6A, for convenience of illustration, only the configuration of one inkjet head 202 is simply shown. However, in the present modification, the head unit 12 may have a plurality of inkjet heads 202. In this case, the plurality of inkjet heads 202 is installed side by side, for example, in a way identical or similar to that of the configuration described with reference to FIG. 1A through FIG. 5C. Also, in FIG. 6A, the plurality of nozzles 402 of the nozzle row 302 is distinguishably shown by a reference symbol A or B. More specifically, odd-numbered nozzles 402 from the top of FIG. 6A are denoted by the reference symbol A. Also, even-numbered nozzles 402 are denoted by the reference symbol B.

Also, in the present modification, one nozzle row 302 is virtually divided into a plurality of nozzle rows. More specifically, in the case shown in FIGS. 6A and 6B, the plurality of nozzles 402 denoted by the reference symbol A and the plurality of nozzles 402 denoted by the reference symbol B are used as virtual nozzle rows, respectively. Also, during each main scan operation, different mask data items are used with respect to the virtual nozzle rows separated from one nozzle row 302, respectively.

FIG. 6B shows an example of the virtual nozzle rows which are used in the present modification. As described above, in the present modification, for example, the plurality of nozzles 402 denoted by the reference symbol A in FIG. 6A is used as one virtual nozzle row 302a. Also, the plurality of nozzles 402 denoted by the reference symbol B is used as another virtual nozzle row 302b. Further, during each main scan operation, different mask data items are used with respect to the nozzle rows 302a and 302b, respectively.

Also, in this case, it can be considered to set different mask data items to be used with respect to the plurality of virtual nozzle rows 302a and 302b, respectively, in a way identical or similar to that in a configuration actually using a plurality of nozzle rows 302 with respect to one selected color. The configuration actually using a plurality of nozzle rows 302 with respect to one selected color means, for example, the configuration described with reference to FIG. 5C.

More specifically, for example, during each main scan operation, it is possible to use a first mask data item as a mask data item for the nozzle row 302a, and use a second mask data item different from the first mask data item, as a mask data item for the nozzle row 302b. Also, it is possible to use a high-frequency mask pattern as the pattern of one of the first mask data item and the second mask data item, and use a low-frequency mask pattern as the pattern of the other.

Even in this configuration, for example, it is possible to appropriately perform printing on each position of a medium, on the basis of a plurality of different mask data items. Also, in this way, it is possible to appropriately suppress the quantity of printing from deteriorating, for example, due to the pattern of a mask data item or the like.

Although the disclosure has been described above by way of the embodiment, the technical scope of the disclosure is not limited to the scope described in the embodiment. It is apparent to those skilled in the art that it is possible to make various changes or modifications in the above described embodiment. It is apparent from a description of claims that forms obtained by making such changes or modifications can also be included in the technical scope of the disclosure.

INDUSTRIAL APPLICABILITY

The disclosure can be suitably used, for example, in printing devices.

The invention claimed is:
1. A printing apparatus for performing printing on a medium in an inkjet method, comprising:
a head unit having a plurality of nozzles for ejecting ink drops onto the medium;
a main scan driver configured to drive the head unit to perform main scan operations of ejecting ink drops from the nozzles while moving in a main scan direction which is predetermined; and
a controller configured to control operations of performing printing on the medium by controlling the main scan operations of the head unit and the main scan driver,
wherein, when the main scan operations are performed, the controller performs control with respect to each area of the medium such that the head unit ejects ink drops of one selected color onto a plurality of first selection pixels selected on a basis of a first mask data item and a plurality of second selection pixels selected on a basis of a second mask data item different from the first mask data item in an arrangement of a plurality of pixels to be selected,
wherein, printing on the plurality of first selection pixels and the plurality of second selection pixels is performed by a plurality of main scan operations to be performed with respect to a same position,
a spatial frequency characteristic of a pixel arrangement of the plurality of second selection pixels is different from a spatial frequency characteristic of a pixel arrangement of the plurality of first selection pixels, in a first pattern of the first mask data item and a second pattern of the second mask data item, a spatial frequency characteristic of one of the first pattern and the second pattern is one-sided on the high frequency side, and a spatial frequency characteristic of the other one of the first pattern and the second pattern is one-sided on the low frequency side, a pattern that is one-sided on the high frequency side is a distance at which spatial frequencies corresponding to 80% or more of all inter-dot distances are higher than a peak frequency of a visual sensitivity function, a pattern that is one-sided on the low frequency side is a distance at which the spatial frequencies corresponding to 80% or more of the all inter-dot distances are lower than the peak frequency of the visual sensitivity function.

2. The printing apparatus according to claim 1, wherein:
the one selected color is a color which is used to blot out a predetermined area.

3. A printing apparatus for performing printing on a medium in an inkjet method, comprising:
a head unit having a plurality of nozzles for ejecting ink drops onto the medium;
a main scan driver configured to drive the head unit to perform main scan operations of ejecting ink drops from the nozzles while moving in a main scan direction which is predetermined; and
a controller configured to control operations of performing printing on the medium by controlling the main scan operations of the head unit and the main scan driver,
wherein, when the main scan operations are performed, the controller performs control with respect to each area of the medium such that the head unit ejects ink drops of one selected color onto a plurality of first selection pixels selected on a basis of a first mask data item and a plurality of second selection pixels selected on a basis of a second mask data item different from the first mask data item in an arrangement of a plurality of pixels to be selected,
wherein:
the head unit includes:
a first nozzle row which is composed of a plurality of nozzles arranged side by side in a sub scan direction perpendicular to the main scan direction; and
a second nozzle row which is composed of a plurality of nozzles arranged side by side in the sub scan direction with an interval from the first nozzle row in the main scan direction, and
when the head unit performs the main scan operations, the controller performs control such that ink drops are ejected from the first nozzle row onto the first selection pixels and ink drops of the same color as that of ink drops which are ejected from the first nozzle row are ejected from the second nozzle row onto the second selection pixels,
printing on the plurality of first selection pixels and the plurality of second selection pixels is performed by a plurality of main scan operations to be performed with respect to a same position,
a spatial frequency characteristic of a pixel arrangement of the plurality of second selection pixels is different from a spatial frequency characteristic of a pixel arrangement of the plurality of first selection pixels,
in a first pattern of the first mask data item and a second pattern of the second mask data item, a spatial frequency characteristic of one of the first pattern and the second pattern is one-sided on the high frequency side, and a spatial frequency characteristic of the other one of the first pattern and the second pattern is one-sided on the low frequency side, a pattern that is one-sided on the high frequency side is a distance at which spatial frequencies corresponding to 80% or more of all inter-dot distances are higher than a peak frequency of a visual sensitivity function, a pattern that is one-sided on the low frequency side is a distance at which the spatial frequencies corresponding to 80% or more of the all inter-dot distances are lower than the peak frequency of the visual sensitivity function.

4. The printing apparatus according to claim 3, wherein:
the first nozzle row and the second nozzle row eject ink drops of ultraviolet curing ink,
the printing apparatus further includes an ultraviolet light source configured to radiate ultraviolet light onto dots formed by the ink drops.

5. The printing apparatus according to claim 1, wherein:
the head unit includes a nozzle row which is composed of a plurality of nozzles arranged side by side in a sub scan direction perpendicular to the main scan direction,
the controller controls the main scan driver such that the main scan driver performs a plurality of main scan operations on each area of the medium,
during a first main scan operation of the plurality of main scan operations, on the basis of the first mask data item, ink drops are ejected from the nozzle row, and during a subsequent main scan operation, on the basis of the second mask data item, ink drops are ejected from the nozzle row.

6. The printing apparatus according to claim 5, wherein:
the nozzle row ejects ink drops of ink which is fixed on the medium by drying.

7. The printing apparatus according to claim 6, wherein:
the ink is solvent ink containing a volatile organic solvent as its main component.

8. A printing method of performing printing by ejecting ink drops from a head onto a predetermined area on a medium while moving the head in a main scan direction, comprising:
a step of ejecting ink drops of one selected color from the head onto a plurality of first selection pixels of the predetermined area of the medium selected on a basis of a first mask data item; and
a step of ejecting ink drops of a same color as that of the ink drops associated with the first mask data item, from the head onto a plurality of second selection pixels of a same area as the predetermined area selected on a basis of a second mask data item different from the first mask data item,
wherein, printing on the plurality of first selection pixels and the plurality of second selection pixels is performed by a plurality of main scan operations to be performed with respect to a same position,
a spatial frequency characteristic of a pixel arrangement of the plurality of second selection pixels is different from a spatial frequency characteristic of a pixel arrangement of the plurality of first selection pixels,
in a first pattern of the first mask data item and a second pattern of the second mask data item, a spatial frequency characteristic of one of the first pattern and the second pattern is one-sided on the high frequency side, and a spatial frequency characteristic of the other one of the first pattern and the second pattern is one-sided on the low frequency side, a pattern that is one-sided on the high frequency side is a distance at which spatial frequencies corresponding to 80% or more of all inter-dot distances are higher than a peak frequency of a visual sensitivity function, a pattern that is one-sided on the low frequency side is a distance at which the spatial frequencies corresponding to 80% or more of the all inter-dot distances are lower than the peak frequency of the visual sensitivity function.

9. The printing apparatus according to claim 2, wherein:

the head unit includes:

a first nozzle row which is composed of a plurality of nozzles arranged side by side in a sub scan direction perpendicular to the main scan direction; and a second nozzle row which is composed of a plurality of nozzles arranged side by side in the sub scan direction with an interval from the first nozzle row in the main scan direction, and when the head unit performs the main scan operations, the controller performs control such that ink drops are ejected from the first nozzle row onto the first selection pixels and ink drops of the same color as that of ink drops which are ejected from the first nozzle row are ejected from the second nozzle row onto the second selection pixels.

10. The printing apparatus according to claim 9, wherein:

the first nozzle row and the second nozzle row eject ink drops of ultraviolet curing ink, the printing apparatus further includes an ultraviolet light source configured to radiate ultraviolet light onto dots formed by the ink drops.

* * * * *